US007672206B2

(12) United States Patent
An

(10) Patent No.: US 7,672,206 B2
(45) Date of Patent: Mar. 2, 2010

(54) RECORDING METHOD OF OPTICAL DISC DEVICE AND METHOD FOR DETERMINING WHETHER THERE IS ABNORMALITY IN THE SAME

(75) Inventor: Sung Man An, Seoul (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 601 days.

(21) Appl. No.: 10/986,221

(22) Filed: Nov. 12, 2004

(65) Prior Publication Data
US 2005/0099922 A1 May 12, 2005

(30) Foreign Application Priority Data
Nov. 12, 2003 (KR) ............ 10-2003-0079664

(51) Int. Cl.
G11B 7/00 (2006.01)
(52) U.S. Cl. ............. 369/47.5; 369/53.27; 369/53.22
(58) Field of Classification Search .............. None
See application file for complete search history.

(56) References Cited
U.S. PATENT DOCUMENTS

| | | | | |
|---|---|---|---|---|
| 5,251,199 A * | 10/1993 | Utsumi et al. | ............ | 369/53.12 |
| 6,434,095 B1 * | 8/2002 | Nishiuchi et al. | ........ | 369/44.27 |
| 6,842,413 B2 * | 1/2005 | Miyaki | ............ | 369/47.53 |
| 6,920,095 B2 * | 7/2005 | Morishima | ............ | 369/47.38 |
| 6,934,235 B2 * | 8/2005 | Seo | ............ | 369/59.11 |
| 6,937,542 B1 * | 8/2005 | Ogawa | ............ | 369/44.13 |
| 7,102,975 B2 * | 9/2006 | Sakai et al. | ............ | 369/53.31 |
| 7,113,468 B2 * | 9/2006 | Udagawa | ............ | 369/59.11 |
| 7,145,857 B2 * | 12/2006 | Seo | ............ | 369/59.11 |
| 7,193,950 B2 * | 3/2007 | Nakamura | ............ | 369/59.11 |
| 7,248,551 B2 * | 7/2007 | Yang | ............ | 369/47.51 |
| 2002/0136120 A1 | 9/2002 | Kurebayashi et al. | | |
| 2005/0025018 A1 * | 2/2005 | Hsu et al. | ............ | 369/53.26 |
| 2006/0280080 A1 * | 12/2006 | Hsu et al. | ............ | 369/47.53 |
| 2007/0036056 A1 * | 2/2007 | Seo | ............ | 369/59.13 |

FOREIGN PATENT DOCUMENTS

| | | | |
|---|---|---|---|
| CN | 1368723 A | | 9/2002 |
| CN | 1399255 A | | 2/2003 |
| JP | 2-265036 A | | 10/1990 |
| JP | 9-63101 A | | 3/1997 |
| JP | 2001-202651 A | | 7/2001 |
| JP | 2004-265490 A | | 9/2004 |
| WO | WO 02097804 A1 * | | 12/2002 |

* cited by examiner

Primary Examiner—Wayne R Young
Assistant Examiner—Adam R Giesy
(74) Attorney, Agent, or Firm—Birch, Stewart, Kolasch & Birch, LLP

(57) ABSTRACT

A recording method and a malfunction detection method of an optical disc device are provided. The level of a signal driving a laser diode is detected during a recording operation. The detected level is compared with a reference limit, and the recording operation is controlled according to the comparison result. If the detected level exceeds the reference limit, a recording speed or power is adjusted downwardly, otherwise it is adjusted upwardly. If the detected level exceeds the reference limit, a malfunction in a front photodetector inside the optical disc device is reported to an external host. Appropriate control of the recording operation according to the disc reflection light incident on the front photodetector prevents degradation of recording quality. The reporting of the abnormality/malfunction in the optical disc device or the front photodetector makes it possible for the user to take a quick action against the abnormality or malfunction.

22 Claims, 4 Drawing Sheets

RECORDING METHOD OF OPTICAL DISC DEVICE AND METHOD FOR DETERMINING WHETHER THERE IS ABNORMALITY IN THE SAME

BACKGROUND OF THE INVENTION

1. Field of the Invention

The present invention relates to a recording method of an optical disc device and a method for determining whether there is an abnormality in the optical disc.

2. Description of the Related Art

An optical disc device generally uses laser power to record data on an optical disc such as a CD (Compact Disc) and a DVD (Digital Versatile Disc). After the laser power is set when the optical disc device is manufactured, the laser power is maintained at an appropriate level by an APC (Automatic Power Control) circuit in an RF (Radio Frequency) IC.

FIG. 1 is a diagram illustrating an optical system-related configuration of an optical disc device according to a related art. As shown in FIG. 1, the optical disc device includes an APC circuit 20 composed of a gain & sample/hold unit 21 and an OP amplifier 22, and an optical pickup 30 composed of a Laser Diode (LD) drive 31 and a Front Photo Detector (FPD) 32. The APC circuit 20 outputs a recording power voltage (VWDC) based both on an FPDO signal received from the front photo detector 32 and a WDAC input voltage applied to the OP amplifier 22. The LD drive 31 drives the Laser Diode (LD) to emit a beam corresponding to the recording power voltage (VWDC) output from the APC circuit 20. The front photo detector 32 detects the beam emitted from the LD, and outputs an FPDO signal corresponding to the detected beam.

The FPDO signal, which has a level corresponding to the beam emitted from the LD, is fed back to the APC circuit 20, and the WDAC input voltage is set to a value corresponding to a desired recording speed or recording power. The WDAC is an input power voltage that is applied to the OP amplifier 22 via an external Digital/Analog Converter (DAC). The APC circuit 20 adjusts the recording power voltage (VWDC) based on the FPDO signal fed back from the front photo detector 32 and the WDAC input voltage. By adjusting the recording power voltage (VWDC) in this manner, the APC circuit 20 allows the recording power to be maintained at an appropriate level set according to the current recording speed.

When a malfunction occurs in the front photo detector 32, light reflected from an optical disc 10 may be incident on the front photo detector 32. When recording is performed at a low recording speed (i.e., with low recording power), the reflection light incident on the front photo detector 32 may cause only a minor problem. However, when recording is performed at a high recording speed (i.e., with high recording power), the intensity of the reflection light incident on the front photo detector 32 increases, thereby having a significant influence on the APC circuit 20. No method has been suggested until now for determining whether or not the disc reflection light is incident on the front photo detector 32 and detecting the intensity of the disc reflection light incident thereon.

According to a related art, if a malfunction occurs in the front photo detector 32, causing the disc reflection light incident on the front photo detector 32 to exceed an allowed range when recording is performed at a high recording speed, then recording is performed with recording power different from the set recording power. This causes abnormal recording sections as shown in FIGS. 2 and 3, thereby lowering the recording quality by the optical disc device.

Furthermore, when the recording quality is lowered due to the malfunction of the front photo detector 32, the user cannot know the lowered recording quality until an after-sale service is received, which makes it difficult to take a quick action against the malfunction of the front photo detector 32.

SUMMARY OF THE INVENTION

Therefore, the present invention has been made in view of the above and other problems, and it is an object of the present invention to provide a method for stabilizing the recording quality of an optical disc device.

It is another object of the present invention to provide a method for detecting a disc reflection light incident on a front photo detector and controlling a recording operation based on the detected disc reflection light.

It is yet another object of the present invention to provide a method for reporting an abnormality in an optical disc device or a malfunction in a front photo detector.

In accordance with one aspect of the present invention, the above and other objects can be accomplished by the provision of a recording method of an optical disc device, comprising detecting a level of a signal for driving a laser diode during a recording operation; comparing the detected level with a predetermined reference range; and controlling the recording operation according to the comparison result.

According to an aspect of the present invention, the recording speed or recording power is adjusted downwardly if the detected level exceeds or falls outside the predetermined reference range. The recording speed or recording power is adjusted upwardly if the detected level is within the predetermined reference range. A malfunction in the front photo detector may be reported to an external host if the detected level exceeds the predetermined reference range.

In accordance with another aspect of the present invention, there is provided a method for determining whether there is an abnormality in an optical disc device, the method comprising detecting a level of a signal for driving a laser diode during a recording operation; comparing the detected level with a predetermined reference level; and determining, based on the comparison result, whether there is an abnormality in the optical disc device. If the detected level exceeds the predetermined reference level, it is determined that there is an abnormality in an optical pickup.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFFERRED EMBODIMENTS

A recording method of an optical disc device and a method for determining whether there is a malfunction in the optical disc device according to preferred embodiments of the present invention will now be described in detail with reference to the accompanying drawings.

Figure 4:
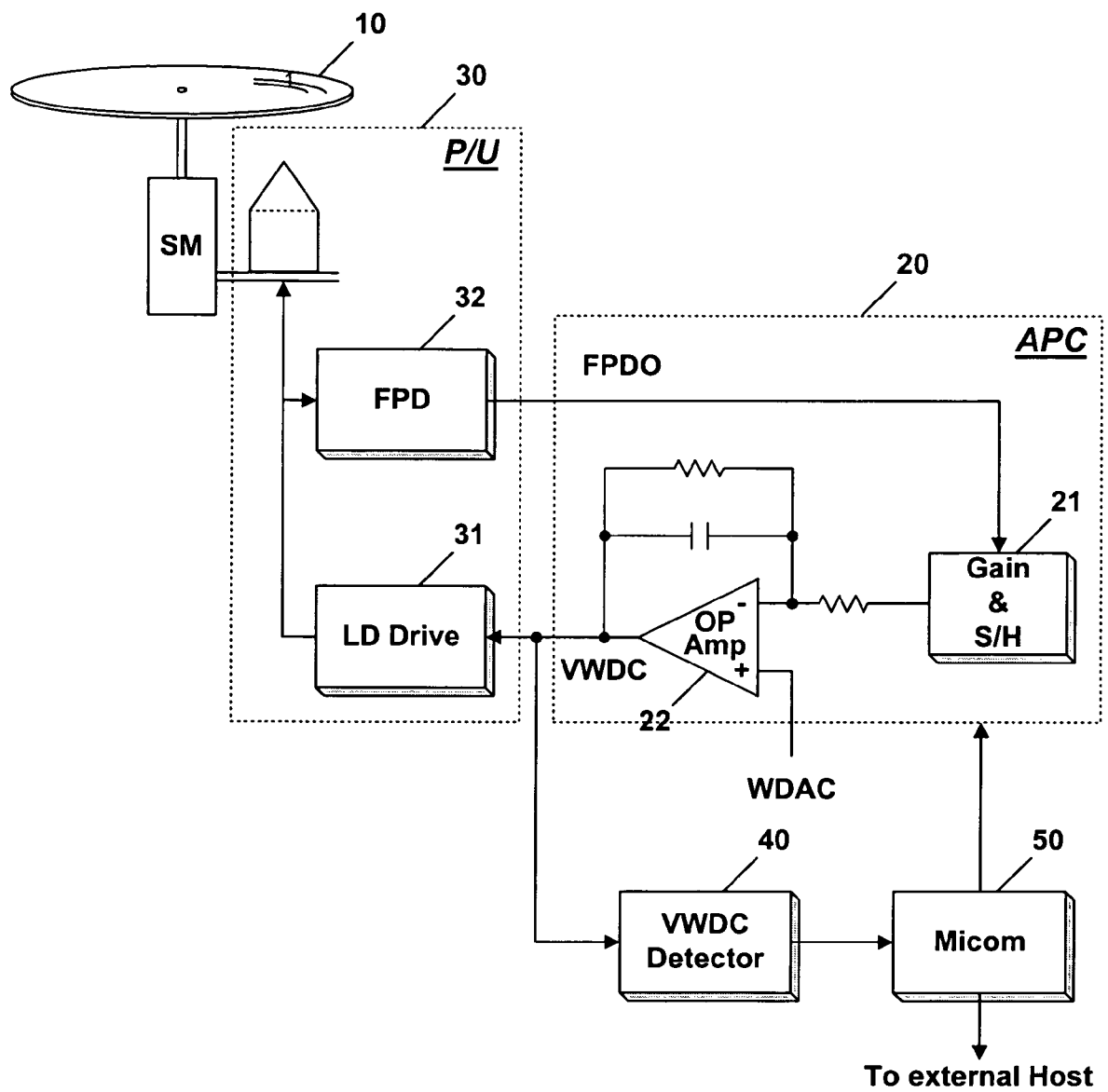
FIG. 4 is a block diagram illustrating the configuration of an optical disc device to which the present invention is applied.

FIG. 4 is a block diagram illustrating the configuration of an optical disc device to which the present invention is applied. As shown in FIG. 4, the optical disc device generally includes the same elements as the conventional optical disc device of FIG. 1. That is, it includes an APC circuit 20 composed of a gain & sample/hold unit 21 and an OP amplifier 22, and an optical pickup 30 composed of a Laser Diode (LD) drive 31 and a Front Photo Detector (FPD) 32.

Figure 1:
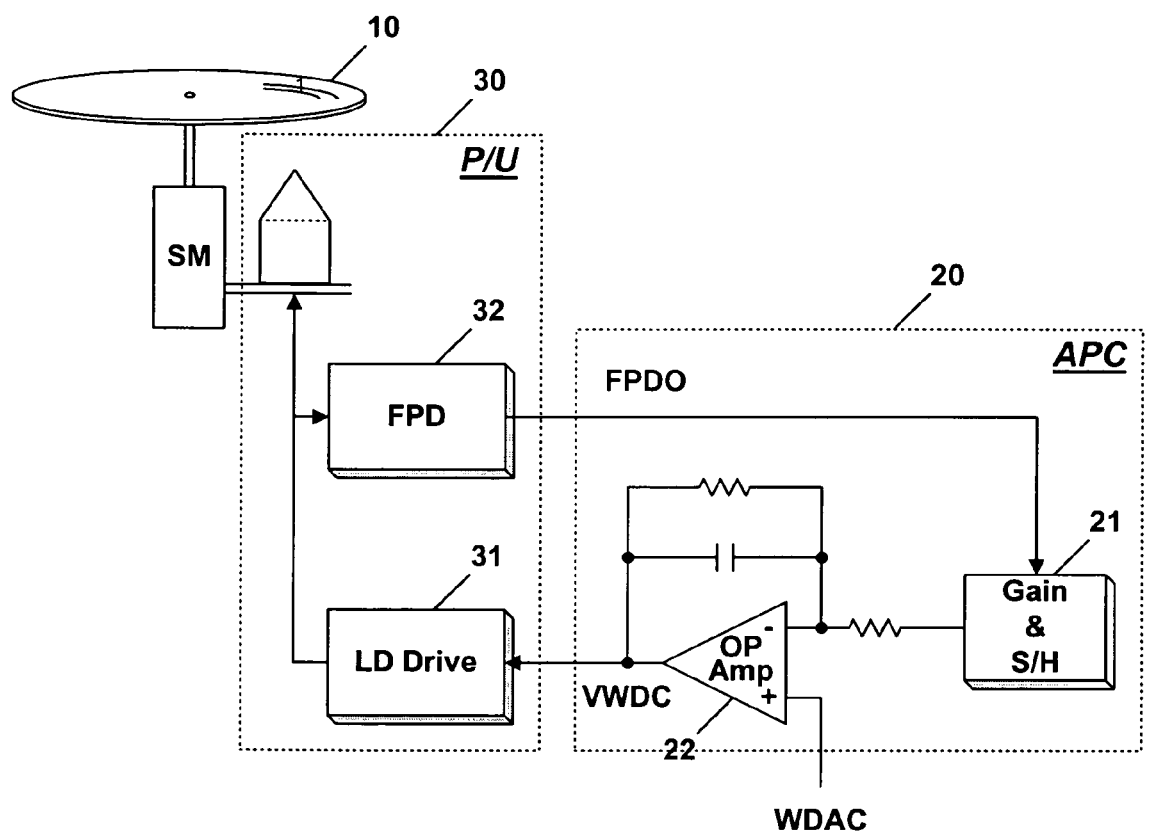
FIG. 1 is a diagram illustrating an optical system-related configuration of an optical disc device according to a related art.
Figure 2:
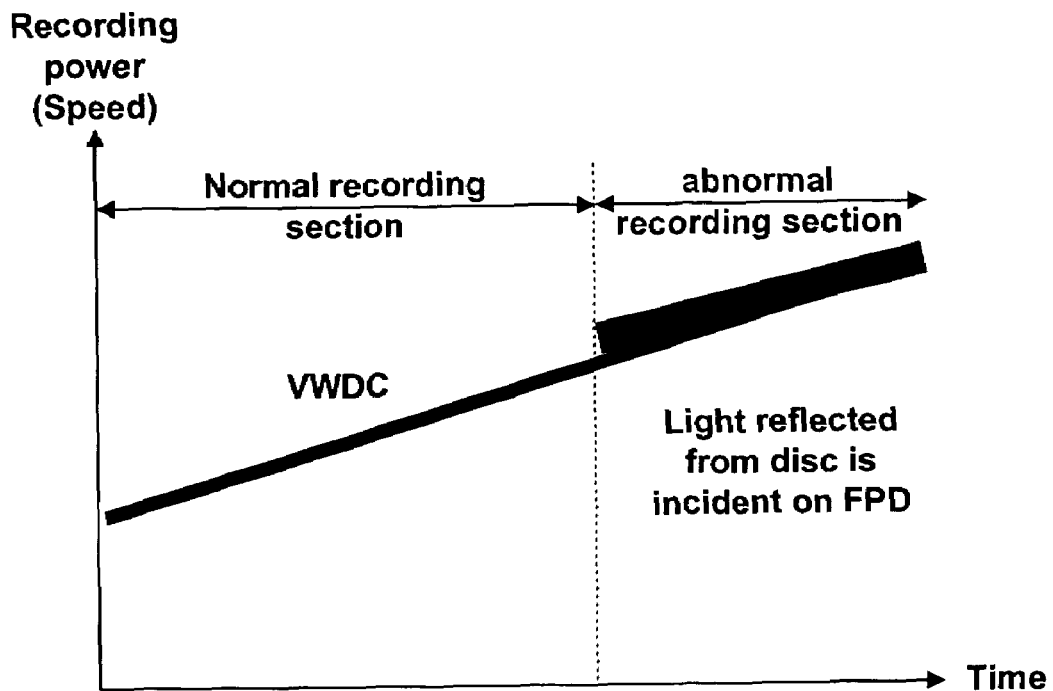
FIGS. 2 and 3 are graphs illustrating examples of abnormal recording sections due to a disc reflection light incident on a front photo detector (FPD) shown in FIG. 1.
Figure 3:
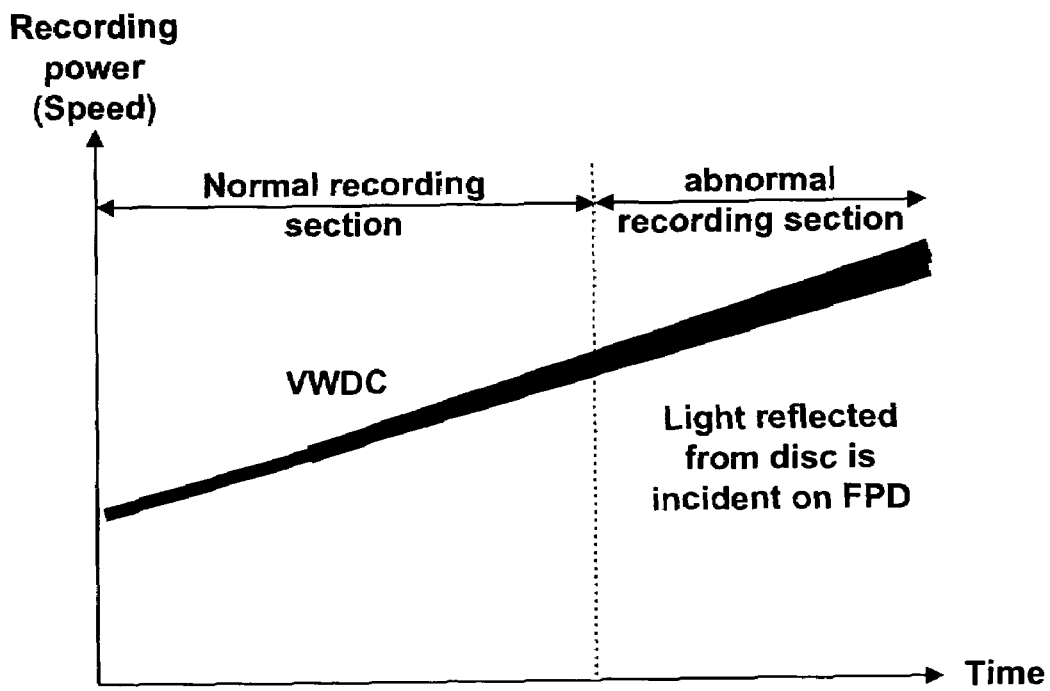

In addition to the elements of the optical disc device of FIG. 1, the optical disc device of FIG. 4 further includes a VWDC detector 40 and a microcomputer 50 according to the present invention. All the components of the optical disc device of FIG. 4 are operatively coupled. The VWDC detector 40 detects the level of a recording power voltage (VWDC) output from the APC circuit 20. The microcomputer 50 adjusts the recording speed or recording power according to the recording power voltage level VWDC detected by the VWDC detector 40, so as to adjust the VDWC level at the output of the OP amplifier 22 accordingly. The microcomputer 50 also reports an abnormality in the optical disc device or a malfunction in the front photo detector 32 to an external host.

Figure 5:
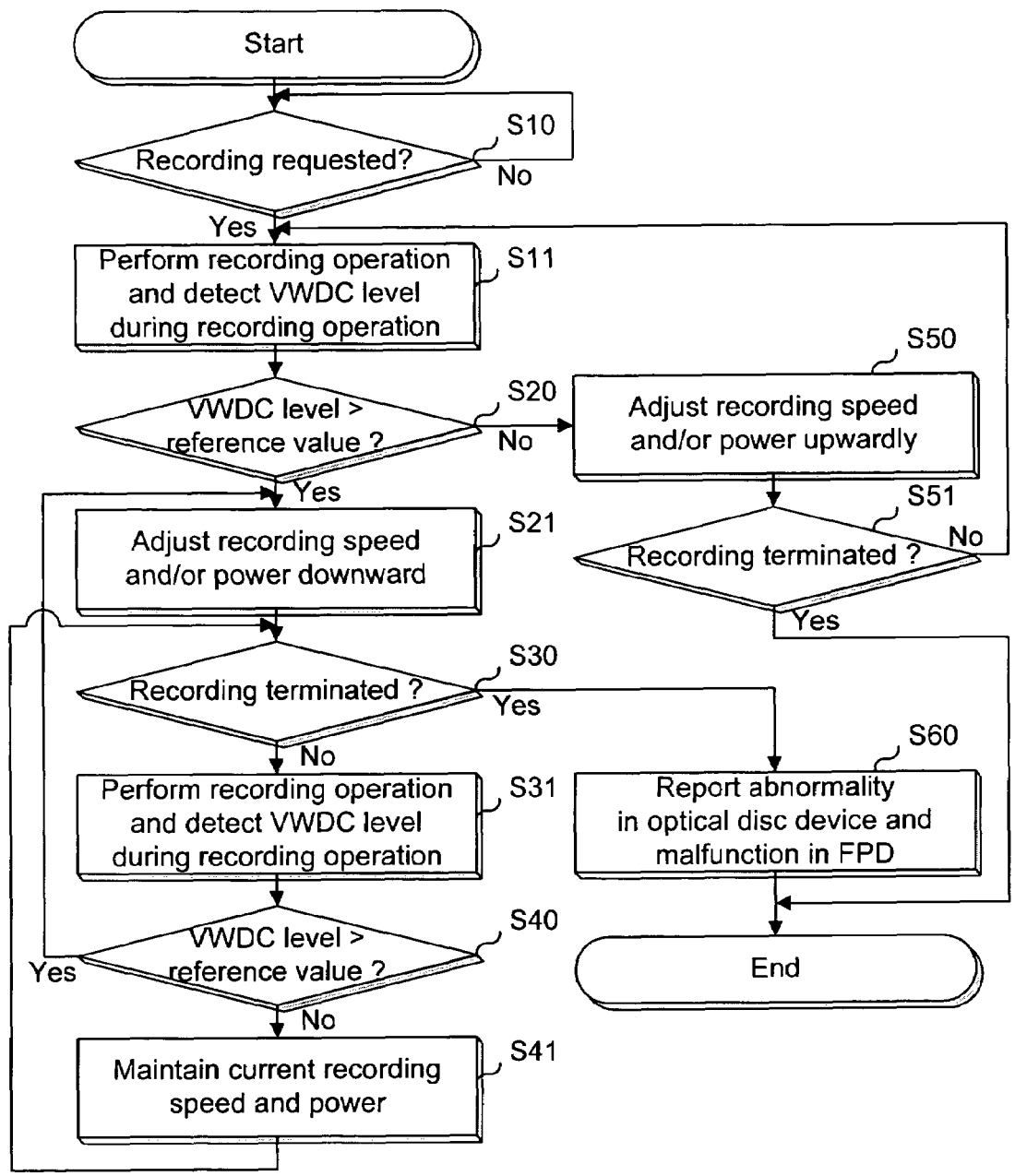
FIG. 5 is a flow chart illustrating a method for recording in an optical disc device and determining whether there is a malfunction in the optical disc device according to an embodiment of the present invention.

FIG. 5 is a flow chart of a method for recording in an optical disc device and determining whether there is an abnormality in the optical disc device according to a preferred embodiment of the present invention. The method shown in FIG. 5 will be described in detail with reference to the configuration of the optical disc device shown in FIG. 4, but can be implemented in other suitable devices/systems.

Referring to FIG. 5, when receiving a recording request, e.g., from a host or user (S10), the microcomputer 50 sets a WDAC input voltage (e.g., by controlling a DAC coupled thereto) according to the desired recording speed or recording power and applies it to the OP amplifier 22 in the APC circuit 20. The APC circuit 20 thus adjusts and outputs the recording power voltage (VWDC) based on the FPDO signal fed back from the front photo detector 32 and the WDAC input voltage applied to the OP amplifier 22. The requested recording is performed based on the adjusted VWDC (S11). By adjusting the recording power voltage (VWDC) in this manner, the APC circuit 20 allows a recording operation to be performed with the recording power set according to the current recording speed.

The microcomputer 50 can detect a reflection light from a disc 10, which is incident on the front photo detector 32 during the recording operation, and can control the recording operation according to the detected reflection light. Since the reflection light incident on the front photo detector 32 is proportional to the recording power voltage (VWDC) level, the microcomputer 50 can detect the disc reflection light incident on the front photo detector 32 based on the VWDC level.

During the recording operation, the VWDC detector 40 detects the level of the recording power voltage (VWDC) which is output from the OP amplifier 22 based on the WDAC input voltage and the FPDO signal (S11). The microcomputer 50 compares the detected VWDC level with a predetermined reference value (for example, 200%) (S20). Here, the reference value can be a range of values. If the comparison result at step S11 indicates that the detected VWDC level is larger than the reference value (or falls outside the reference range), the microcomputer 50 determines that the disc reflection light incident on the front photo detector 32 exceeds an allowed limit, and thus adjusts the current recording speed and/or power downwardly to adjust the VWDC level downwardly at the input to the LD drive 31 (S21). This can be accomplished in a number of different ways. For instance, the microcomputer 50 adjusts the current recording speed downwardly, and adjusts the recording power downwardly to a value corresponding to the downwardly-adjusted recording speed. Then the WDAC can be set to correspond to the lowered recording power value. In another example, the microcomputer 50 lowers the recording speed or recording power and then sets the WDAC to correspond to the lowered recording speed/power. In another example, the microcomputer 50 lowers the recording speed and/or power and adjusts the APC circuit 20 in any known way to lower the VWDC level at the output of the APC circuit 20.

Until the recording is terminated (S30), the microcomputer 50 repeatedly compares the VWDC level, which is detected by the VWDC detector 40 during the recording operation (S31), with the reference value or reference range (S40). If the comparison result at step S40 indicates that the detected VWDC level is larger than the reference value (or falls outside the reference range), the microcomputer 50 determines that the disc reflection light incident on the front photo detector 32 exceeds the allowed limit, and then adjusts the recording speed and/or the recording power downwardly as described above (S21). That is, steps S31, S40 and S21 are repeated until the recording is terminated at step S30.

If the VWDC level detected after adjusting the recording speed and/or power downwardly is equal to or less than the reference value (or falls within the reference range) at step S40, the microcomputer 50 determines that the disc reflection light incident on the front photo detector 32 is within the allowed limit, and then maintains the downwardly-adjusted recording speed and/or power (S41). Since the reflection light incident on the front photo detector 32 is proportional to the recording power voltage (VWDC) level, the microcomputer 50 can detect the disc reflection light incident on the front photo detector 32 based on the VWDC level.

Thereafter, until the recording is terminated, the microcomputer 50 repeats the operation for adjusting the recording speed and/or power downwardly or the operation for maintaining the recording speed or power according to the comparison of the detected VWDC level and the reference value.

On the other hand, if the result of the comparison at step S20 is that the detected VWDC level is equal to or lower than the reference value (or falls within the reference range), the microcomputer 50 determines that the disc reflection light incident on the front photo detector 32 is within the allowed limit, and then adjusts the current recording speed and/or power upwardly t adjust the VWDC level at the output of the APC circuit 20 (S50). Step S50 operates in the same manner as step S21, but the operations at step S50 involve increasing the recording speed and/or power and thus increasing the VWDC level instead of decreasing it. The increased VWDC controls the operation of the LD drive 31 which in turn controls the pickup 30. Until the recording is terminated (S51), the microcomputer 50 compares the VWDC level detected by the VWDC detector 40 with the reference value, and repeats the operation for adjusting the recording speed and/or power downwardly or upwardly or the operation for maintaining the recording speed and power according to the comparison results.

Of course, the recording speed or power is adjusted within the allowed range of the optical disc device.

If it is determined that the disc reflection light incident on the front photo detector 32 exceeds the allowed limit during the recording operation, and thus the recording speed and/or power are adjusted downwardly, the microcomputer 50 determines that there is an abnormality in the optical disc device or there is a malfunction in the front photo detector 32, and reports the abnormality or malfunction to an external host (S60). For instance, the abnormality/malfunction report can be displayed to a user on a display screen coupled to the optical disc device.

As described above, if the microcomputer 50 determines, based on the VWDC level detected during the recording operation, that the disc reflection light incident on the front photo detector 32 exceeds the allowed limit, the microcomputer 50 adjusts the recording speed and/or power downwardly. This stabilizes the recording quality even when there is an abnormality in the optical disc device or a malfunction in the front photo detector 32. In addition, the abnormality of the optical disc device or the malfunction of the front photo detector 32 is reported to the external host. This enables the user to take an appropriate action immediately against the abnormality or malfunction, such as the replacement of the front photo detector 32 when receiving an after-sale service.

As apparent from the above description, the present invention provides a recording method of an optical disc device and a method for determining whether there is an abnormality in the optical disc device, which have the following features and advantages.

Even when a disc reflection light incident on a front photo detector in an optical pickup exceeds an allowed limit, the recording quality of the optical pickup is stabilized instead of being lowered.

In addition, an abnormality of an optical disc device or a malfunction in the front photo detector is reported to an external host, which enables the user to take a quick action against the abnormality or malfunction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A recording method of an optical disc device, comprising:
   detecting directly a level of a recording power voltage output from an automatic power controller (APC) for driving a light source during a recording operation, wherein the level of the recording power voltage controls an operation of a light source drive for driving the light source;
   comparing the detected level of the recording power voltage output from the automatic power controller (APC) with a predetermined reference range to generate a comparison result; and
   controlling the recording operation according to the comparison result by controlling an input control voltage (WDAC) of a control device of the APC relative to an output of a front photo detector.

2. The method according to claim 1, wherein in the controlling step, a recording speed or recording power of the recording operation is adjusted downwardly if the detected level falls outside the predetermined reference range.

3. The method according to claim 1, wherein in the controlling step, a recording speed or recording power of the recording operation is adjusted upwardly if the detected level is within the predetermined reference range.

4. The method according to claim 1, further comprising:
   reporting a malfunction in the front photo detector to an external host if the detected level falls outside the predetermined reference range.

5. The method according to claim 1, wherein in the detecting step, the light source is a laser diode.

6. The method according to claim 1, wherein the controlling step includes:
   adjusting, during the recording operation, the level of the recording power voltage for driving the light source upwardly or downwardly based on the comparison result.

7. The method according to claim 6, further comprising:
   determining that a malfunction exists in the optical disc device if the detected level falls outside the predetermined reference range; and
   reporting the malfunction to an external host.

8. The method according to claim 1, further comprising:
   inputting the recording power voltage output from the APC to a light source driver, wherein the direct detecting of the level of the recording power voltage output from the APC is performed before the output recording power voltage is input to the light source driver.

9. A method for determining whether there is an abnormality in an optical disc device, the method comprising:
   detecting directly a level of a recording power voltage output from an automatic power controller (APC) for driving a light source during a recording operation, wherein the level of the recording power voltage controls an operation of a light source drive for driving the light source;
   comparing the detected level of the recording power voltage output from the automatic power controller (APC) with a predetermined reference level;
   determining, based on the comparison result, whether there is an abnormality in the optical disc device; and
   if the abnormality is determined to occur, controlling the operation of the light source drive by controlling an input control voltage (WDAC) of a control device relative to an output of a front photo detector.

10. The method according to claim 9, wherein the determining step determines that there is a malfunction in an optical pickup of the optical disc device if the detected level exceeds the predetermined reference level.

11. The method according to claim 9, further comprising:
    inputting the recording power voltage output from the APC to a light source driver, wherein the direct detecting of the level of the recording power voltage output from the APC is performed before the output recording power voltage is input to the light source driver.

12. An optical disc devices, comprising:
    an optical pickup having a light source;
    a front photo detector configured to detect a reflected light;
    an automatic power controller (APC) configured to receive and process an output from the optical pickup;
    a detector configured to directly detect a level of a recording power voltage output from the APC for driving the light source during a recording operation and being located outside of the APC, wherein the level of the recording power voltage controls an operation of a light source drive for driving the light source; and a processor configured to compare the detected level of the recording power voltage output from the automatic power controller (APC) with a predetermined reference range, and controlling the recording operation by controlling the automatic power controller according to the comparison result, wherein the processor controls the automatic power controller by controlling an input control voltage (WDAC) of a control device of the automatic power controller relative to an output of the front photo detector.

13. The optical disc device according to claim 12, wherein the processor is configured to adjust a recording speed or recording power of the recording operation downwardly if the detected level falls outside the predetermined reference range.

14. The optical disc device according to claim 12, wherein the processor is configured to adjust a recording speed or recording power of the recording operation upwardly if the detected level is within the predetermined reference range.

15. The optical disc device according to claim 12, wherein the processor is configured to report a malfunction in the front photo detector to an external host if the detected level falls outside the predetermined reference range.

16. The optical disc device according to claim 12, wherein the light source is a laser diode.

17. The optical disc device according to claim 12, wherein the processor is configured to adjust, during the recording operation, the level of the recording power voltage for driving the light source upwardly or downwardly based on the comparison result.

18. The optical disc device according to claim 17, wherein the processor is configured to determine that a malfunction exists in the optical disc device if the detected level falls outside the predetermined reference range, and reports the malfunction to an external host.

19. The optical disc device according to claim 12, further comprising:

a light source driver configured to drive the light source, wherein the detector directly detects the level of the recording power voltage output from the APC before the output recording voltage is input to the light source driver.

20. An optical disc device, comprising:

means for directly detecting a level of a recording power voltage output from an automatic power controller (APC) for driving a light source of the optical disc device during a recording operation, wherein the level of the recording power voltage controls an operation of a light source drive for driving the light source;

means for comparing the detected level of the recording power voltage output from the automatic power controller (APC) with a predetermined reference level;

means for determining, based on the comparison result, whether there is an abnormality in the optical disc device; and means for controlling the operation of the light source drive, if the abnormality is determined to occur, by controlling an input control voltage (WDAC) of a control device relative to an output of a front photo detector.

21. The optical disc device according to claim 20, wherein the determining means includes means for determining that there is a malfunction in an optical pickup of the optical disc device if the detected level exceeds the predetermined reference level.

22. The optical disc device according to claim 20, further comprising:

a light source driver configured to drive the light source, wherein the means for directly detecting detects the level of the recording power voltage output from the APC before the output recording voltage is input to the light source driver.

* * * * *